United States Patent [19]

Leigh

[11] Patent Number: 4,854,597
[45] Date of Patent: Aug. 8, 1989

[54] METAL GASKET HAVING CONICAL AND RADIAL SEALING SURFACES AND METHOD OF USING THE GASKET WITH A TUBULAR ELEMENT

[75] Inventor: Charles Leigh, Washington Township, Morris County, N.J.

[73] Assignee: General Components, Inc., Rockville, Md.

[21] Appl. No.: 147,181

[22] Filed: Jan. 22, 1988

[51] Int. Cl.$^4$ .............................................. F16J 15/08
[52] U.S. Cl. ..................... 277/1; 277/167.5; 277/110; 277/168; 277/178; 277/236; 277/207 A; 285/328; 285/340; 285/917; 285/334.2
[58] Field of Search ................... 277/110, 111, 207 A, 277/167.5, 168, 173, 178, 236, 1; 285/328, 334.2, 334.4, 917

[56] References Cited

U.S. PATENT DOCUMENTS

| | | |
|---|---|---|
| 1,595,310 | 8/1926 | Mueller et al. |
| 3,208,758 | 9/1965 | Carlson et al. ................. 277/167.5 |
| 3,291,497 | 12/1966 | Cross ................................. 277/169 |
| 3,521,910 | 7/1970 | Callahan et al. ............... 285/328 X |
| 3,580,617 | 5/1971 | Ehrenberg ........................ 285/340 |
| 3,989,285 | 11/1976 | Yancey ........................... 285/917 X |
| 4,396,199 | 8/1983 | Boyd et al. ..................... 277/167.5 |
| 4,616,860 | 10/1986 | Faria et al. ................. 277/167.5 X |

FOREIGN PATENT DOCUMENTS

| | | | |
|---|---|---|---|
| 2638018 | 3/1977 | Fed. Rep. of Germany ...... 285/917 |
| 836825 | 6/1960 | United Kingdom ............. 285/334.2 |

Primary Examiner—Robert S. Ward
Attorney, Agent, or Firm—Lane and Aitken

[57] ABSTRACT

A metal gasket for a face-seal fitting has an outer section in the form of a circular annulus, an inner section in the form of a circular annulus and having a shorter axial dimension than the outer section. The inner section and outer sections are joined by a tapered section having conical faces on opposite sides thereof facing toward the axis of the gasket. A method of prolonging the useful life of a tubular element in a face seal fitting involves repeatedly engaging an end of the tubular element with the conical face and, when the end of the tubular element wears, engaging the end with a radial face adjacent to the conical face.

10 Claims, 2 Drawing Sheets

METAL GASKET HAVING CONICAL AND RADIAL SEALING SURFACES AND METHOD OF USING THE GASKET WITH A TUBULAR ELEMENT

A method of prolonging the useful life of a tubular element in a face seal fitting involves repeatedly engaging an end of the tubular element with the conical face and, when the end of the tubular element wears, engaging the end with a radial face adjacent to the conical face.

This invention relates to improved metal gaskets for face-seal fittings.

BACKGROUND OF THE INVENTION

The gasket employed in face-seal fittings in the prior art were either in the form of simple circular annuluses, the shape of which provided no aid in alignment or in sealing or they involved a substantial surface or area of the gasket projecting inside the seal defining crevices which were subject to the problem of entrapping material from the fluid carried by the fitting in which the gasket was employed.

The gasket of the present invention improves over the gaskets of the prior art in that it has a shape which causes the elements of the fitting to align with the gasket so that a uniform sealing force on both sides of the gasket is achieved. Moreover, sealing is provided in a single line contact which enables a maximum sealing force to be applied on each side of the gasket. These advantages are provided while at the same time having a minimum area of the gasket project into the fluid stream so that there is little or no area for entrapping material from fluid flowing through the fitting.

When the gasket of the present invention is used in a face-seal fitting, the number of times that the sealing connection at the gasket can be remade with the same parts is increased. This is very important when one of the members to which the gasket is making a sealing engagement is a gland welded to connecting tubing, because when such a gland has to be replaced, it involves considerable expense.

Accordingly, an object of the present invention is to provide an improved gasket for face-seal fittings.

A further object of the present invention is to provide an improved gasket which is less subject to the problem of entrapment of materials from the fluid flowing through the gasket.

A further object of the present invention is to provide an improved gasket which provides automatic axial alignment between the fitting and the gasket.

A further object of the present invention is to provide an improved gasket which provides single line contact between the fitting and the gasket.

A further object of the invention is to increase the number of times that a sealing engagement may be remade in a fitting without require replacement of the elements of the sealing engagement because of wear.

Further objects and advantages of the present invention will become readily apparent as the following detailed description of the invention unfolds and when taken into conjunction with the drawings.

DESCRIPTION OF A PREFERRED EMBODIMENT

Figure 1:
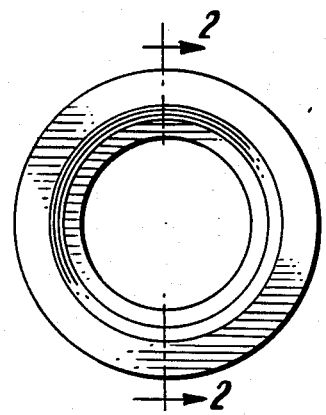
FIG. 1 is a plan view of the gasket of the invention.
Figure 2:
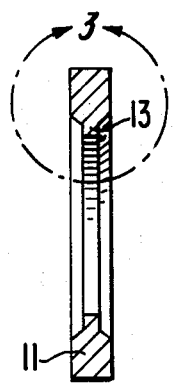
FIG. 2 is an axial sectional view of the gasket of the invention taken along the line 2—2 of FIG. 1.
Figure 3:
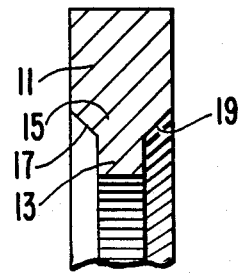
FIG. 3 is an enlarged view of a portion of the gasket within the circle 3 of FIG. 2.

As shown in the drawings, the gasket of the present invention, which is made of stainless steel, nickel, or other metallic substances, is in the form of a circular annulus having an outer circular section 11 and a central circular section 13 of a reduced axial dimension. Between the section 13 and the section 11 is a tapered section 15 having conical faces 17 and 19 on each axial side thereof. The conical faces 17 and 19 are concentric about the axis of the gasket and are inclined at angles of about 43 degrees to the axis.

The gasket is preferably manufactured by forming a central aperture in a metal disk, coining the disk to form the tapered section and the central circular section, and then, machining the inner edge to a uniform inner diameter. When the gasket material is of type which is work hardened by the coining process, the gasket should be annealed after the coining process to soften the material in order to insure that the gasket will make a good seal. Other methods of forming the gasket may be employed such as machining instead of coining.

In a specific embodiment of the invention, the axial length of the section 11 is 0.062 inches, the axial length of the section 13 is 0.027 inches, the outer diameter of the gasket is 0.490 inches, and the inner diameter of the gasket is 0.280 inches. The diameter of the circular locus at the inner edges of the conical faces 15 and 17 is 0.333 inches.

Figure 4:
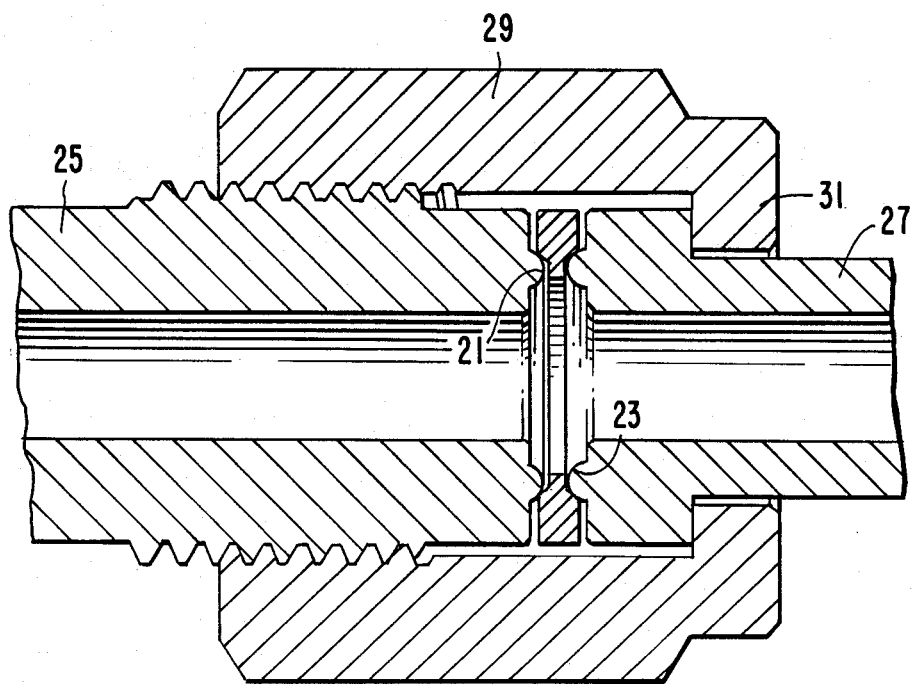
FIG. 4 is an axial sectional view of the gasket shown in place in a typical face-seal fitting.

FIG. 4 shows the gasket of the invention placed in a typical face-seal fitting. In this fitting the gasket is engaged on opposite sides on the conical faces 17 and 19 by annular noses 21 and 23 on connector 25 and gland 27 respectively of the fitting. In the fitting shown in FIG. 4, the connector 25 is externally threaded to fit with the internal threads on a female nut 29, which has an inwardly extending annular lip 31 to engage a corresponding flange on the gland 27, so that as the nut 29 is screwed on the external threads of the connector 25, it pulls the annular noses 21 and 23 into engagement with the conical surfaces 17 and 19 of the gasket. The conical shape of the faces 15 and 17 serves to automatically align the noses 21 and 23 with the gasket and with each other as they are forced into tighter engagement with the conical faces. As a result, a high uniform sealing force is achieved between the noses 21 and 23 and the conical faces 17 and 19 in a line contact. Because of the shape of the gasket, only a small section of the gasket needs to project inside the seal line so that there is only a small area on the gasket for accumulation of material from the fluid passing through the fitting.

Figure 5:
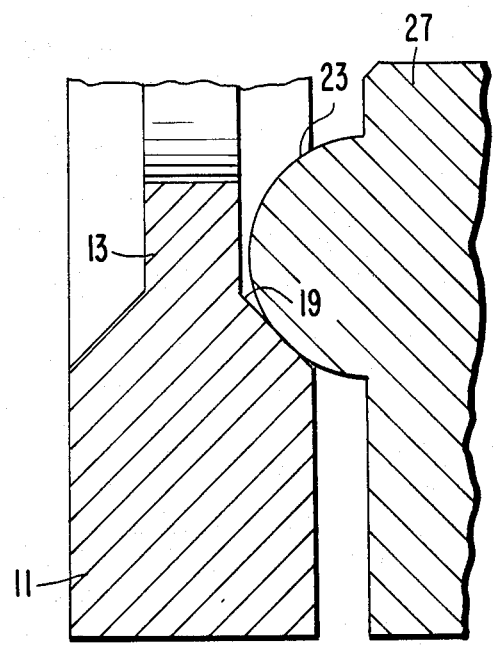
FIG. 5 is an enlarged partial view in section showing the sealing engagement in a face seal fitting with the gasket of the present invention, the first time such an engagement is made.
Figure 6:
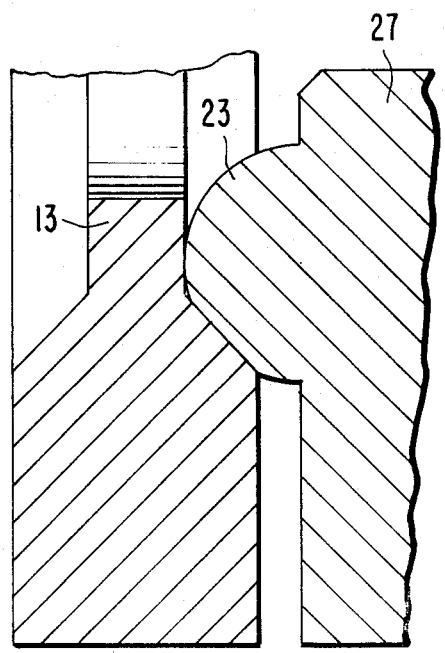
FIG. 6 is an enlarged partial view in section corresponding to FIG. 5 after repeated sealing engagements have been made.

The inner section 13 of the gasket serves a place for material flow during the coining operation of forming the conical faces. In addition, it provides a stop for the noses 21 and 23, should the noses and the conical faces become worked by repeated coupling and decoupling of the fitting. As shown in the enlarged view of FIG. 5 when the nose 23 of the gland 27 is brought into engagement with the gasket 11, it makes contact with the conical face 19. In order to achieve a sealing contact, the fitting 29 as shown in FIG. 4, should be turned ⅛ turn past finger tight. This causes the curved surface of the nose 23 to deform slightly, this being exaggerated in the illustration of FIG. 5. Because of this deformation of the nose 23, repeated remakes of the seal between the gasket and the nose 23 will cause the nose 23 to wear or be permanently deformed. However, each time any permanent deformation occurs, the point of the engagement advances down the conical surface 19. After repeated remakes, the nose will advance sufficiently forward that the front portion of the nose 23 engages the radial sidewall of the inner axial section 13 as shown in FIG. 6. At this point a new seal is formed by the front portion of the nose 23 and the inner radial surface of the sidewall. The seal then being obtained will be of the same type that is achieved by a flat gasket on its initial makeup. Accordingly, the structure of the gasket of the invention makes it possible to have a much greater number of repeated remakes the sealing engagement before it is necessary to replace the gland 27.

The above description is of a preferred embodiment of the invention, and modification may be made thereto without departing from the spirit and scope of the invention which is defined in the appended claims.

What is claimed is:

1. A gasket comprising an outer section in the form of a circular annulus defining a central axis, an inner section in the form of a circular annular concentric with the annulus of said outer section and having an axial dimension shorter than the axial dimension of said outer section, a tapered section connecting said outer section with said inner section, said tapered section having conical faces directed inwardly toward the axis of said circular annuluses, wherein said outer section has faces perpendicular to said central axis, and said axial dimension of said outer section is constant throughout said outer section.

2. A gasket as recited in claim 1, wherein said conical faces are symmetrical.

3. A gasket as recited in claim 2, wherein said conical faces are tapered at an angle of about 43 degrees to the axis of said gasket.

4. A method of prolonging the useful life of a tubular element in a face seal fitting comprising providing a gasket with a conical surface adapted to engage the end of said tubular element in said face seal fitting and with a radial surface adjacent to said conical surface, repeatedly engaging said end of said tubular element with said conical surface in a sealing engagement, and when the end of said tubular element wears after repeated remakes of said sealing engagement, engaging said end of said tubular element in sealing engagement with said radial surface.

5. A face seal fitting, comprising:
a first tubular element having a first annular end formation;
a second tubular element having a second annular end formation; and
a gasket including
an outer section in the form of an annulus having a first axial dimension,
an inner section in the form of an annulus concentric with the annulus of said outer section, said inner section having a second axial dimension shorter than said first axial dimension, and
a tapered section connecting said outer section with said inner section, said tapered section defining two bevel faces directed away from one another and inwardly toward the axis of said annuluses, wherein said first annular end formation engages one of said bevel faces in a first region, and said second annular end formation engages the outer of said bevel faces in a second region, and the axial distances between the first and second regions of engagement is at least as great as said second axial dimension of said inner section.

6. The face seal fitting according to claim 5, wherein the faces are conical.

7. The face seal fitting of claim 5, wherein said bevel faces are in axial alignment with one another.

8. The face seal fitting of claim 5, wherein each of said bevel faces defines an angle of about 43 degrees with the axis of said gasket.

9. The face seal gasket of claim 5, wherein said gasket is made of metal.

10. A face seal fitting, comprising:
a first tubular element having a first annular end formation;
a second tubular element having a second annular end formation; and
a gasket including
an outer section in the form of an annulus having a first axial dimension,
an inner section in the form of an annulus concentric with the annulus of said outer section, said inner section having a second axial dimension shorter than said first axial dimension, and
means for aligning said first tubular element with said second tubular element, said aligning means comprising a tapered section connection said outer section with said inner section, said tapered section defining two bevel faces directed away from one another and inwardly toward the axis of aid annuluses, wherein said first annular end formation engages one of said bevel faces in a region spaced from said inner section, and said second annular end formation engages the other of said bevel faces in a region spaced from said inner section.

* * * * *